(12) United States Patent
Boddy et al.

(10) Patent No.: US 8,195,599 B2
(45) Date of Patent: Jun. 5, 2012

(54) INFERRING SYSTEM-LEVEL PROPERTIES

(75) Inventors: Mark S. Boddy, St. Paul, MN (US);
Hazel S. Shackleton, Minneapolis, MN (US); Todd P. Carpenter, St. Paul, MN (US); Kyle S. Nelson, Minneapolis, MN (US)

(73) Assignee: Adventium Enterprises, Minneapolis, MN (US)

( * ) Notice: Subject to any disclaimer, the term of this patent is extended or adjusted under 35 U.S.C. 154(b) by 656 days.

(21) Appl. No.: 12/389,945

(22) Filed: Feb. 20, 2009

(65) Prior Publication Data
US 2010/0076737 A1    Mar. 25, 2010

Related U.S. Application Data

(60) Provisional application No. 61/030,416, filed on Feb. 21, 2008.

(51) Int. Cl.
*G06F 15/00* (2006.01)
*G06F 15/18* (2006.01)

(52) U.S. Cl. ............... 706/62; 706/45; 706/46; 706/47

(58) Field of Classification Search ................ None
See application file for complete search history.

(56) References Cited

U.S. PATENT DOCUMENTS

| | | | | |
|---|---|---|---|---|
| 6,002,854 | A * | 12/1999 | Lynch et al. ............. | 703/1 |
| 6,099,575 | A * | 8/2000 | Hardin et al. ............. | 703/22 |
| 6,675,294 | B1 * | 1/2004 | Gupta et al. ............. | 713/1 |
| 7,464,064 | B1 * | 12/2008 | Smith ..................... | 706/47 |
| 7,644,377 | B1 * | 1/2010 | Saxe et al. ............... | 716/106 |
| 2002/0165701 | A1 * | 11/2002 | Lichtenberg et al. ..... | 703/7 |
| 2004/0153295 | A1 * | 8/2004 | Lohmann et al. ......... | 703/1 |
| 2005/0091036 | A1 * | 4/2005 | Shackleton et al. ...... | 704/9 |
| 2006/0100829 | A1 * | 5/2006 | Lynch et al. ............. | 703/1 |
| 2006/0184292 | A1 * | 8/2006 | Appleby et al. .......... | 701/23 |
| 2008/0103750 | A1 * | 5/2008 | Khasidashvili et al. ... | 703/16 |

OTHER PUBLICATIONS

Boddy et al. "System-Level Autonomy Trust Enabler (SLATE)", AIAA, 2008, pp. 1-13.*
Parthasarathy et al. "An Efficient Finite-Domain Constraint Solver for Circuits", DAC, 2004, pp. 212-217.*
Boddy, et al., "Clockwork: Requirements Definition and Technology Evaluation for Robust, Compiled Autonomous Spacecraft Executives", Final Report, NASA Grant NAG-2-1624, Jan. 15, 2004, pp. 1-55.
Boddy, et al., "A New Method for the Solution of Large Systems of Continuous Constraints", COCOS-02 , 14 pages.
Boddy, et al., "Integrated Planning and Scheduling for Petroleum Refinery Operations," American Association for Artificial Intelligence, 2004, 7 pages.

(Continued)

*Primary Examiner* — Omar Fernandez Rivas
(74) *Attorney, Agent, or Firm* — Brooks, Cameron & Huebsch PLLC

(57) ABSTRACT

The present disclosure includes methods, devices, and systems for inferring system-level properties. One or more embodiments include generating a constraint model based on a system model having a number of components at different levels of abstraction and on a number of verified component properties. The constraint model can include a number of mission constraints modeling one or more mission requirements, a number of system constraints modeling one or more system-level properties, mid a number of component constraints modeling one or more component properties. One or more embodiments can include analyzing the constraint model with a constraint solver to determine whether one or more particular system-level properties can be inferred from the constraint model.

19 Claims, 6 Drawing Sheets

OTHER PUBLICATIONS

Giannakopoulou, et al., "Component Verification with Automatically Generated Assumption," Journal of Automated Software Engineering, vol. 11, Kluwer, 2004, pp. 1-30.

Frank, et al., "Constraint Based Attribute and Interval Planning", Journal of Constraints, 2002, pp. 1-31.

Laborie, et al., "Planning with Sharable Resource Constraints," Proceedings of IJCAI-95, pp. 1643-1649.

Software Engineering Institute, "Open Source AADL Tool Environment (OSTATE)," http://la.sei.cmu.edu/aadlinfosite/OpenSourceAADLToolEnvironment.html, 2006, 2 pages.

Buffington, et al., "Validation and Verification of Intelligent and Adaptive Control Systems," AFRL-VA-WP-TP-2003-334, Oct. 2003, pp. 1-10.

O'Leary, D. E., "Verification and Validation of Intelligent Systems: Five Years of AAAI Workshops", International Journal of Intelligent Systems, vol. 9, 1994, p. 653-657.

Eclipse Open Development Platform, http://www.eclipse.org/, Accessed Aug. 2008, (2 pgs.).

* cited by examiner

INFERRING SYSTEM-LEVEL PROPERTIES

This application claims priority from U.S. Provisional Application Ser. No. 61/030,416, filed Feb. 21, 2008, the entire content of which is incorporated. herein by reference.

BACKGROUND

Manned, unmanned, and autonomous systems are growing increasingly complex and contain functions with life and safety critical implications. A challenge exists in inadequately testing and evaluating that the implemented systems will reliably meet their design requirements. This activity is sometimes called verification and validation (V&V) or test and evaluation (T&E). Current V&V and T&E techniques are suited for many systems with limited autonomous capabilities, but advanced autonomy and increased complexity makes testing enormously more difficult and in some instances these techniques are no longer suitable.

The V&V and T&E difficulties arise primarily from two characteristics. First, highly autonomous systems have a complex internal state. This can result in an exponential increase in the effort required for V&V or T&E, because the system's internal state becomes part of the space that testing must cover. Consequently, a highly autonomous system interacting with a complex environment represents a challenge for V&V and T&E. Current approaches to achieve high confidence in such systems can be resource, labor, and time prohibitive.

Secondly, most highly autonomous systems are heterogeneous. They are typically constructed in multiple levels, comprising at least low-level control, an intermediate layer of reactive execution, and a high-level mission planning function. In particularly complex cases, there may be more than just three levels. Such heterogeneous systems may pose a special difficulty for testing, because the mapping between different functional layers can become part of the testing problem. It is no longer simply a question of how two or more system components interact. If these components are in different functional layers, the errors or information loss in. the mapping between representations should also be taken into account.

Relevant prior art for V&V approaches can broadly be divided into work on: component V&V for smaller, homogeneous components of high-level control and autonomous systems; constraint-based models for planning, scheduling, and execution; and solving and optimization for hybrid constraint models. Component V&V methods fall broadly into the categories of testing, static checking applied at a source-code level to establish validity of initial values and parameters passed between routines, model-checking methods based either on various kinds of automata or Boolean satisfiability, and automated synthesis methods. Constraint-based models for planning, scheduling, and execution are used to specify and predict behavior, especially for applications of the size and complexity typically found in systems related to space exploration. Solving and optimization of hybrid constraint models is pursued in several separate technical communities. Within Operations Research, Mixed Integer Linear and Nonlinear models are employed. Some researchers in this community have been investigating "mixed logical-linear" methods that integrate mathematical programming with methods for satisfiability or constraint satisfaction more commonly used in Computer Science. The constraint satisfaction community within Computer Science is bridging this gap as well, working in the other direction.

However, current V&V and/or T&E techniques have various limitations such as a limited ability to efficiently and adequately infer system-level properties without exorbitant amounts of testing,

DETAILED DESCRIPTION

Figure 1:
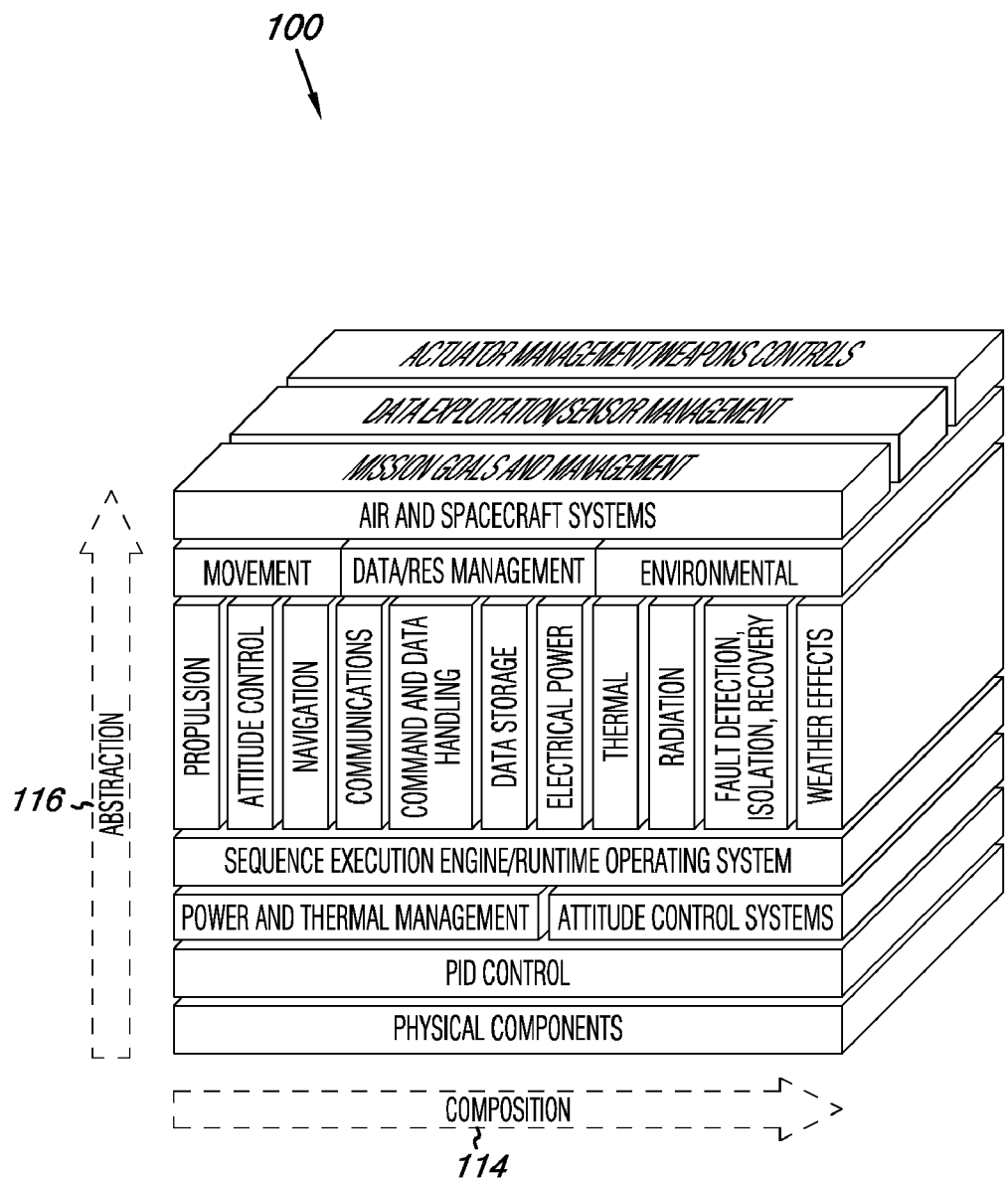
FIG. 1 illustrates a functional model of a system for which system-level properties can be inferred in accordance with one or more embodiments of the present disclosure.

The present disclosure includes methods, devices, and systems for inferring system-level properties. One or more embodiments includes generating a constraint model based on a system model having a number of components at different levels of abstraction and on a number of verified component properties. The constraint model can include a number of mission constraints modeling one or more mission requirements, a number of system constraints modeling one or more system-level properties, and a number of component constraints modeling one or more component properties. One or more embodiments can include analyzing the constraint model with a constraint solver to determine whether one or more particular system-level properties can be inferred from the constraint model.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "01" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

Many previous verification and validation (V&V) techniques provide component guarantees, but do not fully address the behavior of systems built from those components. However, human acceptance of autonomy typically hinges on trusting system-level behavior. Embodiments of the present innovation can provide the capability to verify system properties for complex autonomous systems operating in rich and unpredictable environments, thus providing the trust arguments for the acceptance of autonomous systems in. mission-critical and/or safety-critical applications.

Given component-level behavioral guarantees, embodiments of the present disclosure can employ constraint-based models and reasoning to support compositional reasoning across components at the same level of abstraction in a control hierarchy, and/or across the abstraction mappings defining the different layers in that hierarchy, by building a formal constraint model, expressed as mathematical relationships, within each level of abstraction and between different levels.

For some complex systems, it may not be enough to have a fixed set of behaviors at the lower level that are then invoked in "safe" ways from the top. For example, in path-planning for an autonomous ground vehicle, higher-level knowledge of the terrain and/or the planned path can be used to set control parameters for how the path can be traversed.

In some instances, however, the system's behavior has to be verified, for example, through testing or other means against a wide range of both mission goals and/or environmental conditions. With embodiments of the present innovation, the increase in testing that would otherwise be needed can be avoided by reasoning up and/or down the control system's layers of abstraction. Such embodiments can be used to establish that if the lower-level control system stays within certain bounds (e.g., on navigational accuracy), then the mission planner can generate safe plans to the goal position. Conversely, we can establish that if the mission planner never commands the system to move closer than a specified. tolerance to hazards or obstacles, then the navigational uncertainty of the control system only has to be tested to fall within a relaxed set of error bounds.

One or more embodiments of the present innovation enable incremental testing of system-level properties and support the maintenance and derivation and/or rederivation of guarantees on system behavior in response to changes in factors such as the environment, the platform being controlled, and/or the mission profile, among various other factors.

FIG. 1 illustrates a functional model 100 of a system for which system-level properties can be inferred in accordance with one or more embodiments of the present disclosure. In the embodiment illustrated in FIG. 1, the model 100 is for an example heterogeneous air and/or spacecraft system. As such, the functional model 100 includes several functional layers that can be organized into an abstraction hierarchy as shown. The functional layers can represent different layers of abstraction associated with functional model 100.

In the example illustrated in FIG. 1, the model 100 includes a low level layer that may be referred to as a device layer. In model 100 the device layer is shown as "PHYSICAL COMPONENTS" and can include system hardware such as motors and sensors, among various other hardware components and/or subsystem. hardware.

In the example illustrated in FIG. 1, the model 100 also includes a number of intermediate layers, which each include one or more system components and/or subsystems associated therewith. One or more of the intermediate layers may be referred to as control layers. In the model 100, the first intermediate layer is shown as "PID CONTROL" and can include one or more components and/or subsystems associated with proportional-integral-derivative (PID) control functions. The model 100 also includes an intermediate layer that includes "POWER AND THERMAL MANAGEMENT" as well as "ATTITUDE CONTROL SYSTEMS," an intermediate layer that includes "SEQUENCE EXECUTION ENGINE/RUNTIME OPERATING SYSTEM," and an intermediate layer that includes "PROPULSION," "ATTITUDE CONTROL," "NAVIGATION," "COMMUNICATIONS," "COMMAND AND DATA HANDLING," "DATA STORAGE," "ELECTRICAL POWER," "THERMAL," "RADIATION," "FAULT DETECTION, ISOLATION, RECOVERY," and "WEATHER EFFECTS." The model 100 also includes an intermediate layer that includes one or more components and/or subsystems associated with "MOVEMENT," "DATA/RES (resource) MANAGEMENT," and "ENVIRONMENTAL" models.

In the example illustrated in FIG. 1, the model 100 also includes a high level layer of abstraction that may be referred to as a planning layer. In model 100 the planning layer is shown as including "MISSION GOALS AND MANAGEMENT," "DATA EXPLOITATION/SENSOR MANAGEMENT," and "ACTUATOR MANAGEMENT/WEAPONS CONTROLS."

In the model 100, the lower layers support higher layers by providing services, and higher layers provide increased levels of functionality. Each of the layers of model 100 can include one or more system components and/or subsystems. For instance, layers might be monolithic with this perspective, or each layer might have many components within it. Top level applications, such as mission management or data exploitation, might rely on individual components beneath it or on the composition of the effects of all the subsystems.

The embodiment illustrated in FIG. 1 includes notional information flows 114 (COMPOSITION) and 116 (ABSTRACTION). The notional flows show, in a general way, that abstraction is moving information up a layered system view (e.g., system model 100) and composition is reasoning within a layer. Although not shown in FIG. 1, various embodiments can also include a form of reasoning referred to as embedding. As described further below, embedding is a type of composition that includes relating the behavior of complex control systems to the changing demands of the environment.

Embodiments of the present disclosure are not limited to the example illustrated in FIG. 1. For instance, although various examples described herein focus on inferring system-level properties of systems associated with unmanned or manned vehicle systems, various embodiments can be used to infer system-level properties of systems other than air and/or spacecraft systems, and/or such systems may be more or less complex than the system model 100 (e.g., the system model may include more or fewer layers of abstraction).

As an example, embodiments of the present disclosure can be applied in other complex domains with success, for example, deriving bounds on control settings for refinery processing units from upstream and/or downstream constraints on material properties, flow-rates, inventory levels, and/or the requirements of other processing units. Other systems which can be analyzed via one or more embodiments of the present disclosure include automated life support systems and autonomous ground vehicles, among various other systems having physical components and/or subsystems within a component hierarchy and having control functions capable of being represented at multiple layers of abstraction within a control hierarchy (e.g., the hierarchy of model 100 shown in FIG. 1).

Figure 2:
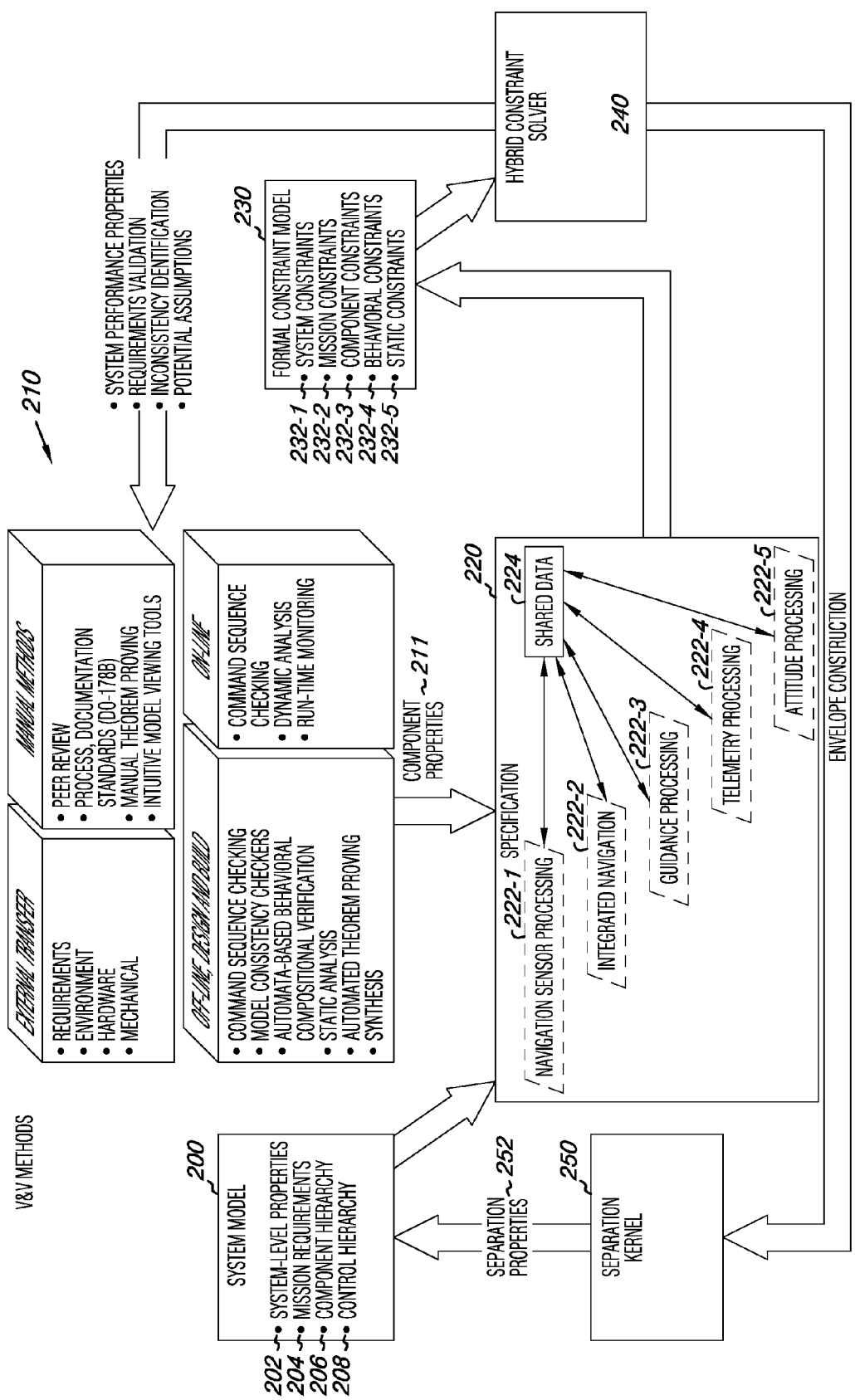
FIG. 2 illustrates a flow diagram for inferring system-level properties in accordance with one or more embodiments of the present disclosure.

FIG. 2 illustrates a flow diagram for inferring system-level properties in accordance with one or more embodiments of the present disclosure. One or more embodiments include maintaining a system model having a number of levels of abstraction (e.g., system model 100 shown in FIG. 1). In various embodiments, the layers of abstraction associated with a particular system model can include, a device layer, a control layer, an execution layer, and a planning layer. However, embodiments are not limited to system models having particular types or having particular numbers of layers of abstraction.

The embodiment illustrated in FIG. 2 includes a system model 200 that includes a number of system-level properties 202, a number of mission requirements 204, a component hierarchy 206, and a control hierarchy 208. The system model 200 can be a model of a system such as a manned or unmanned vehicle system (e.g., aircraft, spacecraft, watercraft, ground vehicles, etc.), an automated life support system, or a refinery system, among various other systems capable of multiple modes of behavior and/or comprising multiple levels of abstraction. In one or more embodiments, the system model 200 can also include an environment model (e.g., a model of one or more environments within which a particular system may be interacting).

As used herein, system level-properties (e.g., 202) refer to measureable or inferable properties of a particular system and are to be distinguished from component properties and subsystem properties, which refer to individual components or subsystems that are a part of a larger system. In various embodiments, system-level properties (e.g., 202) can correspond to system-level trust properties such as safety, liveness, criticality, real-time concerns, and/or performance, among various other trust properties that can be associated with a particular system. System-level properties may also be referred to herein as "system-level requirements." As described further herein, various embodiments of the present disclosure can be used to verify (e.g., prove) satisfaction of the system-level trust properties 202.

As used herein, mission requirements (e.g., 204) can relate to desired system objectives, behaviors, and/or goals of a particular system's operation. The mission requirements may also be referred to herein as "mission properties." Mission properties (e.g., 204) can be distinguished from system-level properties (e.g., 202) in that system-level properties refer to system states or system behaviors that may not be directly related to a particular mission goal or objective. As an example, a mission property may include a goal of "taking a picture of that particular rock," while indirectly related system-level properties may include "don't tip over," or "don't cause damage to the habitat," among other properties indirectly related to a particular mission property. Examples of system-level properties 202 and mission requirements 204 are described further below in connection with FIGS. 4 and 5.

The component hierarchy 206 of system model 200 illustrated in FIG. 2 can include models of one or more physical system components. Physical components can include motors, sensors, and/or actuators, among various other physical system components capable of being modeled in multiple levels.

The control hierarchy 208 of system model 200 illustrated in FIG. 2 can include a hierarchy of control functions. The control functions of hierarchy 208 can include navigation control, arm control, rate control, sensor control, and power management, among various other control functions capable of being modeled at different levels of abstraction with control hierarchy 208.

In various embodiments, and as described further below, the system-level properties (e.g., 202) associated with a system model (e.g., 200) can be mapped to one or more of a number of physical system components associated with a component hierarchy (e.g., 206) and/or can be mapped to one or more control functions associated with a control hierarchy (e.g., 208) associated with the system model (e.g., 200). An example of such mapping is described further below in connection with FIG. 5.

The embodiment illustrated in FIG. 2 includes a number of validation and verification techniques 210. The V&V techniques 210 are grouped into a number of categories such as tools used off-line and during the development process (OFF-LINE, DESIGN AND BUILD), on-line tools used for the active system (ON-LINE), and other techniques such as transferring the V&V load to other parts of the system (EXTERNAL TRANSFER), as well as manual methods (MANUAL METHODS). In the embodiment illustrated in FIG. 2, the tools used off-line and during the development process include command sequence checking, model consistency checkers, automata-based behavioral compositional verification, static analysis, automated theorem proving, and synthesis. The on-line tools used for the active system include command sequence checking, dynamic analysis, and run-time monitoring. The techniques for transferring the V&V load to other parts of the system include techniques for external transfer to requirements (e.g., system/mission requirements), environment, hardware, and mechanical components. The manual methods can include peer review, process or documentation standards (e.g., DO-178B), manual theorem proving, and intuitive model viewing tools.

Embodiments are not limited to the example V&V techniques 210. These techniques 210 and/or other existing or new V&V methods can provide evidence of component and/or subsystem behaviors about which one or more embodiments of the present disclosure will then reason. For instance, one or more of the V&V techniques 210 can be used to verify one or more component properties associated with physical components of the component hierarchy 206 and/or component properties associated with functional components of the control hierarchy 208 of system model 200.

In various embodiments, the functional components of a complex, highly-autonomous system interact with one another and/or with the environment in several different ways and can utilize different forms of reasoning, such as composition (e.g., 114 shown in FIG. 1), embedding, and abstraction (e.g., 116 shown in FIG. 1). Composition is reasoning where the collective behavior of a set of interacting modules (e.g., components, subsystems, and/or processes) are at a single level of abstraction, given known or assumed behavioral characteristics of the individual modules. For example, in an autonomous rendezvous and docking (ARD) system (e.g., in-flight refueling, satellite operations, etc.), error bounds on estimates of relative velocity, attitude, and position can be derived from known properties of the available sensing hardware, along with the computational properties of post-processing and sensor fusion functions such as Kalman filters. Those error bounds can then be used to establish bounds on the allowable maximum control error in velocity, attitude, and position, for a given control algorithm and set of effectors (e.g., thrusters). This reasoning will also utilize knowing the physical configuration of the vehicle being controlled, as its mass, center of gravity, relative position of the thrusters, and moments of inertia will all affect the system's behavior for a given set of control decisions.

Embedding, or relating the behavior of complex control systems to the changing demands of the environment, is a type of composition. In embedding, the range of conditions, for example temperature, pressure, wind speed, terrain slope, humidity, incident energy, moving obstacles, or other agents that may be encountered in the environment, become part of the composition being considered.

Abstraction is reasoning where interactions between modules across different abstraction boundaries maps from one level of representation (e.g., pixels, or second-by-second route-traversal) to another (objects in the visual field, or waypoint navigation). In such embodiments, abstraction mappings should be validated with regard to a number of potential error sources. For example, information loss addresses that the abstraction mapping may obscure relevant information utilized to prove properties at the higher level of abstraction.

As an example, ground-based waypoint navigation between locations will typically include only an abstract model of the intervening terrain, perhaps as a set of costs (power, time) or uncertainty bounds (a difficult traversal may have a much less predictable duration). If this loss of precision is explicitly modeled, it can be incorporated into the system-level proof, for example, by making worst-case assumptions regarding the missing information. Another potential source of error is that the abstraction mapping can be outright incorrect, for example, errors in identifying an object in the visual field, or in determining the system's current location. Providing a model of the nature and/or likelihood of these potential errors can enable system-level V&V and T&E reasoning about them.

Reasoning across abstraction boundaries to support system-level V&V and T&E involves some capabilities that may not be obvious at first glance. In an interaction between mission planning and execution, for example, typically either the projections used in planning must be sufficiently accurate, or the execution system sufficiently capable of controlling to a specified trajectory, to avoid projected failures (e.g., "Executing a return to base at the requested airspeed will exhaust the available fuel before touchdown."). In addition, abstraction mapping should permit propagation in both directions, so that information added at one level, such as plan models and control accuracy in the previous examples, can constrain reasoning in other abstraction layers.

As described further below, one or more embodiments of the present disclosure implement processes of composition, abstraction, and/or embedding, for example, by using constraint-based behavioral envelopes. Constraint-based behavioral envelopes permit propagation of constraints (e.g., constraints 232-1, 232-2, 232-3, 232-4, and 232-5) from one function (hardware or software) backward or forward through a chain of related functions (e.g., hardware sensors, software filtering, identification, decision, and/or limitations on hardware actuators). Using constraint envelopes can result in a strongly least-commitment form of search for a solution or for a proof of infeasibility.

In one or more embodiments and as shown in FIG. 2, a specification 220 can be used to represent a number of the components and/or subsystems of a particular system being tested (e.g., a system for which inference of system-level properties is desired). In the example illustrated in FIG. 2, the specification 220 is represented using the Architecture Analysis and Design Language (AADL). However, embodiments are not limited to a particular design language. As one of ordinary skill in the art will appreciate, AADL can represent subsystems or components in the system being tested, attributes on those components (e.g., cost, weight, power, heat generated), and relationships between those components (e.g., inside, above, before). In the embodiment illustrated in FIG. 2, the specification 220 includes subsystem elements 222-1 (Navigation Sensor Processing), 222-2 (Integrated Navigation), 222-3 (Guidance Processing), 222-4 (Telemetry Processing), and 222-5 (Attitude Processing) and their interaction with shared data 224 (e.g., shared memory).

In one or more embodiments, one or more formal constraint models (e.g., 230) can be generated via a specification such as specification 220 based on a system model (e.g., 200) and a number of verified component properties (e.g., a number of component properties 211 verified via one or more of the V&V techniques 210). As such, in this process, the system model 200 can be translated into a formal constraint model 230.

The constraint model 230 can be built using manual techniques and/or automated techniques (e.g., using AADL scheduling, reliability, latency analysis tools), for example. The constraint model 230 can permit reasoning about allowed relationships and can provide a framework for reasoning and successive refinement.

In the embodiment illustrated in FIG. 2, the formal constraint model 230 includes system constraints 232-1, mission constraints 232-2, component constraints 232-3, behavioral constraints 232-4, and static constraints 232-5. The system constraints 232-1 model system-level properties (e.g., system-level properties 202). The mission constraints 232-2 model mission requirements (e.g., mission requirements 204). The component constraints 232-3 model component and/or subsystem properties such as those associated with component hierarchy 206 and control hierarchy 208. Behavioral constraints 232-4 can refer to time-varying component properties. As an example, the rate of change in temperature would be subject to a behavioral constraint. Static constraints 232-5 can refer to properties of the system which are not directly related to dynamics and the passage of time. As an example, overall vehicle mass can be subject to a static constraint. Embodiments are not limited to the particular types of constraints within formal constraint model 230.

As described further below, the constraint model 230 can be provided as input to a constraint solver (e.g., hybrid constraint solver 240). In various embodiments, the constraint solver 240 can be used to analyze the constraint model 230 to determine whether one or more particular system-level properties (e.g., 202) can be inferred from the constraint model 230. In one or more embodiments, the constraint solver 240 may not be a hybrid constraint solver (e.g., a. mixture of discrete and continuous values may not be involved in the analysis of the formal constraint model 230).

Existing or new linear, nonlinear, or hybrid constraint solving systems, such as a simple finite-domain constraint propagation and solving engine with an open-source MILP) engine (e.g., Bonsai-G) may be used to evaluate a constraint graph associated with one or more constraints of constraint model 230 to verify requirements satisfaction, validate consistency, identify system performance properties, as well as to identify inconsistencies (e.g., the system requires more memory than it has), and potential assumptions (e.g., a processor of speed X is required, but was not specified). Three example architectures for a hybrid constraint solving engine are shown in FIGS. 3A, 3B, and 3C.

In various embodiments, and as illustrated in FIG. 2, operation on the formal constraint model 230 by the hybrid constraint model 240 can provide outputs to both the original design process as well as to additional analysis indicating capabilities if additional separation properties 252 (e.g., spatial partitioning and/or time partitioning, among other separation properties) arc introduced into the system model 200.

In the embodiment illustrated in FIG. 2, a separation kernel 250 can receive outputs from the constraint solver 240 for separation property analysis. Although embodiments are not so limited, the separation kernel 250 can be a. LynxSecure Separation Kernel, for example.

As illustrated in FIG. 2, the hybrid constraint solver 240 can determine system performance properties, validate requirements, identify inconsistencies, and can determine potential assumptions, which can then be output to the original design process. In various embodiments, one or more results output from the hybrid constraint solver 240 can be used to modify the system model 200, which can allow for incremental refinement and evaluation as the cycle illustrated in FIG. 2 repeats.

In various embodiments, behavioral envelopes apply directly to composition. By segmenting the problem into manageable pieces, the approach illustrated in FIG. 2 can provide a means to incrementally re-evaluate a system-level T&E proof and identify which constraints (e.g., 232-1, 232-2, 232-3, 232-4, and 232-5) may no longer be satisfied. As previously discussed, embedding can be handled as a subset of composition, using such an approach. Embodiments of the present innovation can be used to support reasoning about abstraction using behavioral envelopes that utilize, as additional information, a characterization of the abstraction mapping, including models of the nature and/or likelihood of potential errors as described above.

In various embodiments, a constraint-based approach can have a number of advantages, including access to a broad variety of propagation and solution techniques, many providing formal guarantees of correctness and/or completeness. In addition, constraint-based models can make it much easier to support both incremental modifications and bi-directional reasoning (i.e., to change which are the premises, which are the conclusions). Thus, using the same model we can reason either from component behaviors and properties to system-level properties (providing proofs of correctness), or from system-level properties to constraints on component behavior (deriving sufficient sets of assumptions under Which a proof could be derived, and thus proposed component-level tests).

In various embodiments, the constraint-based models can be integrated across multiple levels of abstraction and used to provide a system-level test generation function and/or testing plan. For instance, the example shown in FIG. 2 illustrates how embodiments of the present innovation exploit the bi-directionality of a constraint-based behavioral envelope approach to develop an inverse form of inference, deriving sufficient conditions on component behavior to be able to prove that the system-level properties (e.g., system-level properties 202) and/or goals will be satisfied.

Its support for incremental reasoning (for example, the ability to explore different designs efficiently) address life-cycle concerns, while support for reconfiguration (based on that same incremental reasoning) can, for example, be useful for dealing with dynamic environments, changes in mission profiles and/or requirements (e.g., mission requirements 204), and/or hardware and software changes to one or more system components (e.g., components associated with component hierarchy 206 and/or control hierarchy 208). In various embodiments, the approach to defining behavior as envelopes of acceptable performance and integrating with standard tools enables testing of inherently non-deterministic systems, without attempting the impossible goal of testing all possible behaviors, by testing that the envelopes are not violated.

In various embodiments, the hybrid constraint solver 240 can analyze the formal constraint model 230 and can determine whether one or more Of the system constraints, mission constraints, component constraints, behavioral constraints, and/or static constraints arc satisfied, are not satisfied, or whether further information is needed to determine whether one or more of the constraints is or is not satisfied. In one or more embodiments, if the hybrid constraint solver 240 determines, based on the current constraint model 230, that a particular system-level property (e.g., 202) is infeasible, or that more information is needed in order to make a feasibility determination as to the particular system-level property, the hybrid constraint solver 240 can identify one or more additional constraints which, when added to the formal constraint model 230, can be used to determine whether the particular system-level property (e.g., 202) is satisfied (e.g., proved or disproved).

FIGS. 3A, 3B, and 3C illustrate three example architectures for a hybrid constraint solving engine (e.g., hybrid constraint solver 240 shown in FIG. 2) that can be used in accordance with one or more embodiments of the present disclosure. As illustrated in FIGS. 3A, 3B, and 3C, the respective constraint solvers 301-0, 301-1, and 301-2 are hybrid constraint solvers. That is, each of the solvers 301-0, 301-1, and 301-2 can operate on both discrete and continuous constraints.

As illustrated in FIGS. 3A, 3B, and 3C, each of the constraint solvers 301-0, 301-1, and 301-2 includes a respective discrete solver 360-0, 360-1, and 360-2. The solver 301-0 includes a continuous feasibility oracle 362, the solver 301-1 includes a continuous culprit identifier 364, and the solver 301-2 includes a continuous solver 366.

In the example illustrated in FIG. 3A, the discrete solver 360-1 is capable of making discrete decisions, some of which lead to the addition of constraints in the continuous feasibility oracle 362. The continuous feasibility oracle 362 is configured to return a decision (YES/NO) regarding whether the continuous model remains feasible in light of added constraints.

The example illustrated in FIG. 3B is similar to the example illustrated in FIG. 3A. In the example illustrated in FIG. 3B, the continuous culprit identifier 364 can return a decision (YES/NO) regarding whether the continuous model remains feasible in light of added constraints from the discrete solver 360-1. However, the continuous culprit identifier 364 can also return a set of "culprits" if the current continuous model is infeasible. The term culprits can refer to added constraints causing the continuous model to be infeasible.

In the example illustrated in FIG. 3C, the CCHIPS Framework 368 can be configured to control the interaction between the discrete solver 360-2 and the continuous solver 366. For instance, the framework 368 can direct when the solvers 360-2 and 366 are active, and on which portions of the respective models the solvers 360-2 and 366 are active.

Figure 3:
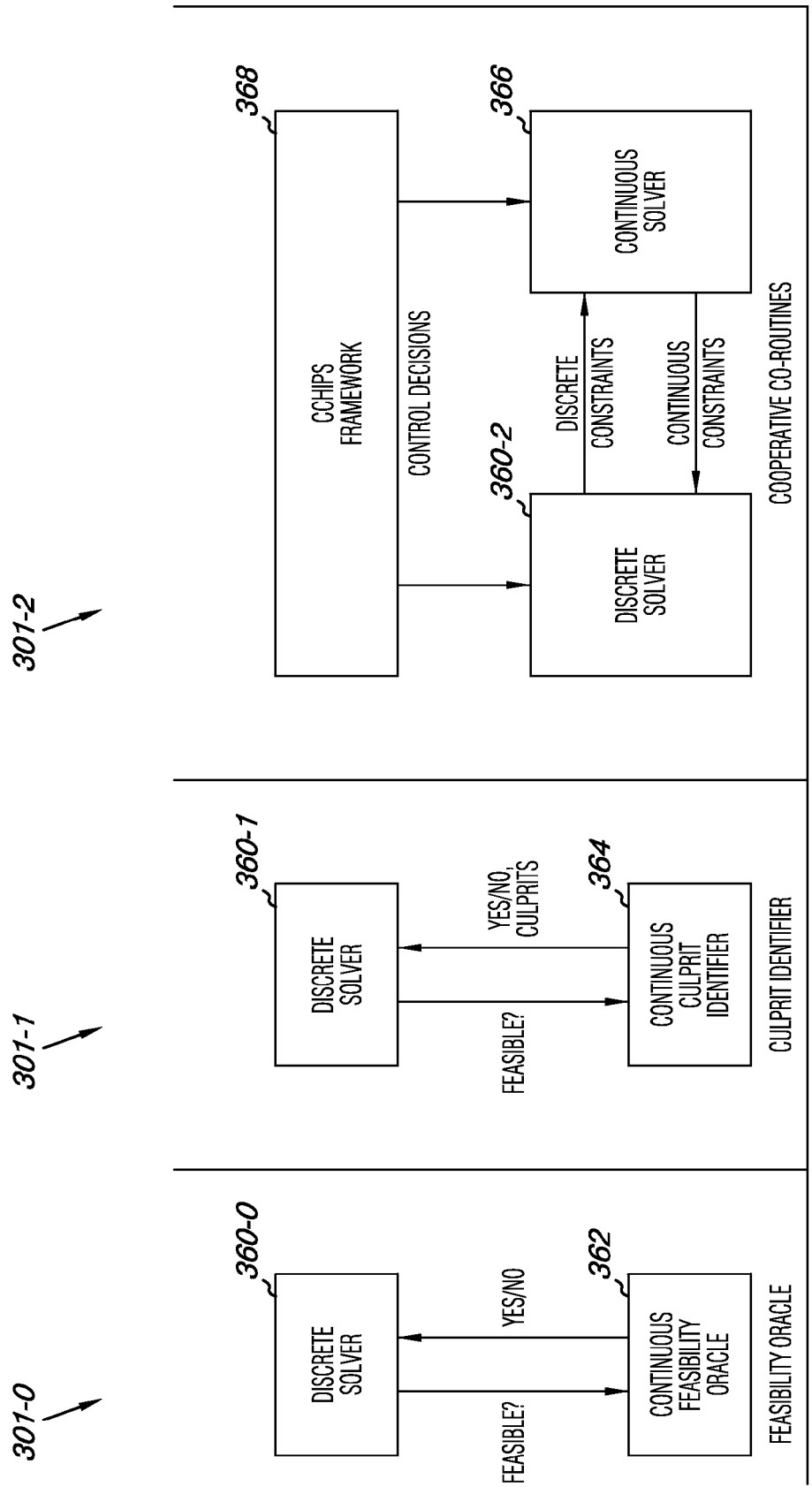
FIGS. 3A, 3B, and 3C illustrate functional architectures for constraint solvers in accordance with one or more embodiments of the present disclosure.

Embodiments of the present disclosure are not limited to the examples illustrated in FIGS. 2 and 3. For instance, other constraint solving systems (e.g., MiniSAT, HyperSAT, UBC-SAT, QBFLIB, CPlex, COIN-OR), modeling tools (e.g., UML, VHDL), separation kernels (e.g., DDC-I DEOS, GreenHills INTEGRITY, Xen, VMWare), and other components can be used in various embodiments. Also, embodiments may include a number of additional supporting tools that can be used to model and characterize the physical and functional components, document and/or model the specifications, and/or analyze the constraints.

Figure 4:
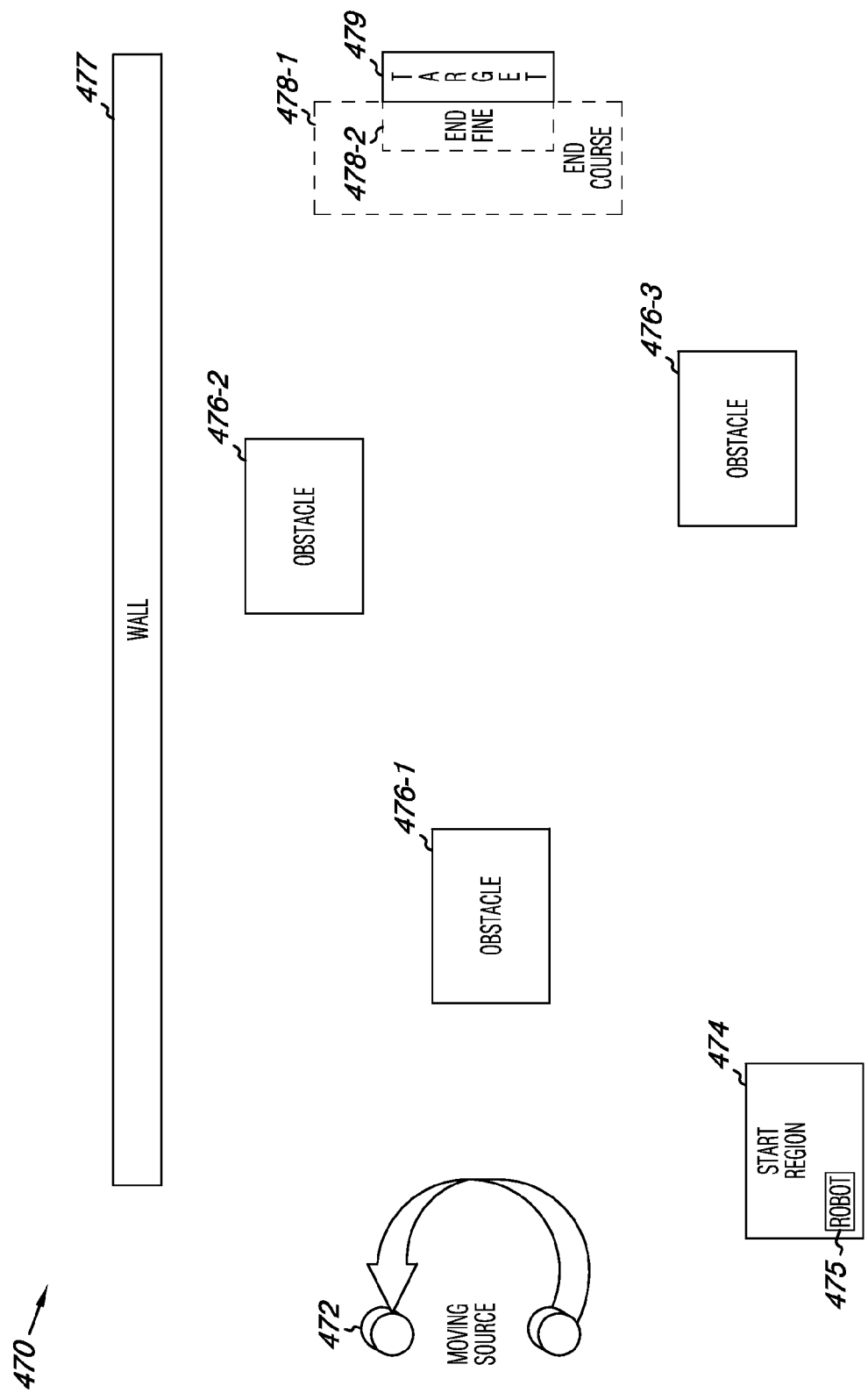
FIG. 4 illustrates an environment associated with a system for which system-level properties can be inferred in accordance with one or more embodiments of the present disclosure.

FIG. 4 illustrates an environment 470 associated with a system 475 for which system-level properties can be inferred in accordance with one or more embodiments of the present disclosure. That is, the system 475 is an example system for which a system model having a number of components at different levels of abstraction (e.g., system. model 100 or 200 shown in FIGS. 1 and 2) can be generated and analyzed as described in connection with the analysis flow illustrated in FIG. 2.

Figure 5:
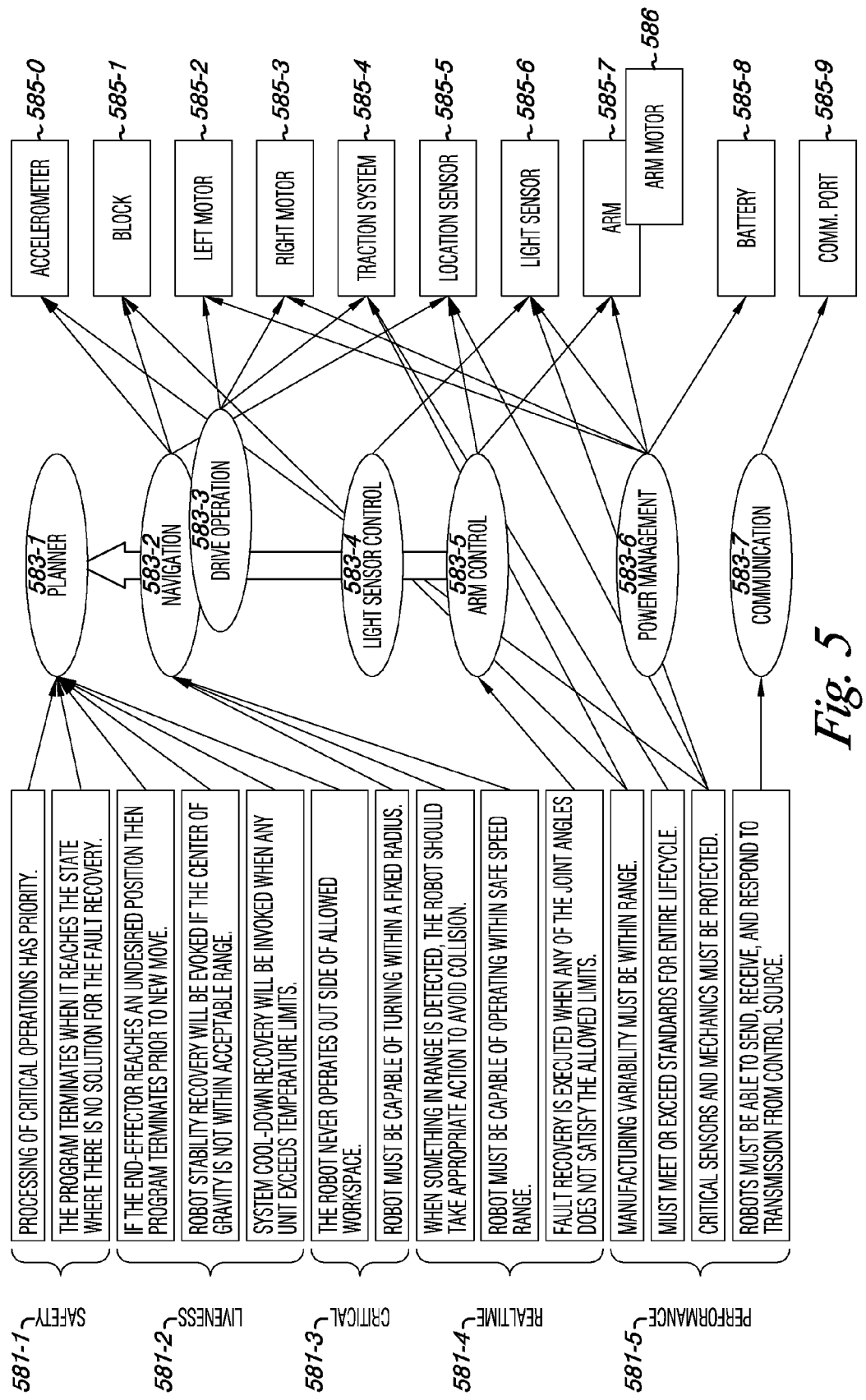
FIG. 5 illustrates a portion of a mapping of system-level properties to components at different levels within a hierarchy for the system shown in FIG. 4.

In the embodiment illustrated in FIG. 4, the system 475 is a robotic. system (e.g., a robot 475). The robot 475 has several hardware and software components not shown in FIG. 4. A number of these components are shown in FIG. 5, which illustrates a portion of a mapping of system-level properties associated with the robot 475 to components of the robot that are modeled at different levels of abstraction within a hierarchy in accordance with one or more embodiments of the present disclosure.

In the example described in connection with FIGS. 4 and 5, the robot was designed with four wheels, two powered with good traction, and two neutral with low friction. Each of the powered wheels, at the rear of the robot, was controlled by separate motors (e.g., left motor 585-2 and right motor 585-3 shown in FIG. 5). Each motor worked independently. The front wheels acted as skids to allow the robot 475 to turn freely. An optical light sensor 585-6 was mounted on the rear of the robot 475 and was controlled using a motor mounted horizontally. The motor rotated the sensor a full 360 degrees, but there was no slip-joint or other rotational interface for the sensor control and data lines, so there was a bound on how far the sensor can be rotated in each direction.

Two touch sensors (e.g., location sensor 585-6) were located on the front of the robot 475, positioned to align with a docking station (e.g., target 479). There was an arm 585-7 mounted on the side of the robot 475. In this example embodiment, successful contact between the arm 585-7 and the designated target 479 was the indication of a successful mission.

In this example, a mission requirement of the robot was that the robot navigate from the starting region 474 to the target 479 while maintaining the light sensor 585-6 located on a moving source 472. The robot's mission in this scenario requires that the light sensor control 583-4 run in parallel to the navigation code 583-2. In this example embodiment, this parallel processing allows one to demonstrate how the two functions (e.g., light sensor control and navigation control) have interactions other than the need for the light sensor 585-6 to reposition as the robot 475 turns corners or moves away from the light source 472.

The mission design described in FIGS. 4 and 5 includes multiple execution phases, with constraints among them based on one phase setting the initial conditions (including the initial error) for the next phase. As shown in FIG. 5, the robot control system (e.g., arm control 583-5, light sensor control 583-4, navigation control 583-2) can be implemented hierarchically, thus supporting a test of abstraction mapping.

The robot 475 can simulate a rover with the mission requirements to dock at a fixed station and keep a sensor aligned to a light source. The demonstration environment, for example the environment 470 shown in the embodiment illustrated in FIG. 4, includes a performance area with three obstacles 476-1, 476-2, and 476-3 and a target area 479. The robot 475 can be required to navigate from the starting region 474 at one end of the performance area, around the obstacles 476-1, 476-2, and 476-3, and end at the target 479 which is located at the opposite end of the performance area.

In the embodiment illustrated in FIGS. 4 and 5, the navigation process was broken into three parts: the coarse navigation phase, which moves the robot 475 from the start region 474 to near the target (e.g., to region 478-1), the fine navigation phase (e.g., within region 478-2), which will align the robot 475 with the target 479, and the arm navigation phase which will drop the robot's arm 585-7 to land on the target 479 at a given position. In addition, through all of the navigation phases, the robot can be required (as a mission requirement) to maintain a sensor (e.g., light sensor 585-6) on a moving light source 472, and align itself to a fixed observation target within a given time.

The embodiment illustrated. in FIG. 5 shows a number of system-level properties 581-1 (SAFETY), 581-2 (LIVENESS), 581-3 (CRITICAL), 581-4 (REAL TIME), and 581-5 (PERFORMANCE) associated with the robot 475 shown in FIG. 4. FIG. 5 includes a portion of a mapping of the system-level properties 581-1, 581-2, 581-3, 581-4, 581-5, to one or more appropriate functional and/or physical components at various levels of abstraction.

In the embodiment illustrated in FIG. 5, the robot 475 was modeled in tour layers: device, control, execution, and planning. The device layer represented the actual hardware (e.g., physical components) that make up the robot 475. In this example, the hardware includes an accelerometer 585-0, a block 585-1 (e.g., processing hardware such as a CPU), a left motor 585-2 and a right motor 585-3 associated with rear wheels of the robot, a traction system 585-4, a location sensor 585-5, a light sensor 585-6, an arm 585-7 and an arm motor 586 used to move arm 585-7, a battery 585-8, and a communication port 585-9. As the reader will appreciate, the example shown in FIG. 5 can include more. or fewer physical components, in some embodiments.

In the embodiment illustrated in FIG. 5, the control layer and the device layer were both components of the robot 475 and its programming environment. High level control blocks such as Navigation 583-2 and Arm Control 583-5 use a combination of sensor reading and conformant positioning (or other error mitigation techniques) to minimize the propagation of uncertainty and perform a series of lower level control blocks or device level operations.

In the embodiment illustrated in FIG. 5, the execution layer represents a next level of detail. The coarse navigation mode, fine navigation mode, arm navigation mode, light sensor scan mode, light sensor tracking mode and communications sensor mode were the primary pieces at this level. Each of these modes can have one of several algorithmic solutions assigned and each can have a set of requirements (such as acceptable error) that needs to be met independently.

The planning layer was at the same high level of abstraction as a mission plan and can be directed primarily by the mission requirements. For example, one objective of the mission plan was for the robot 475 to reach the target 479 at a given position in the coordinate system within an acceptable error, time, and power usage. In one or more embodiments a tool for inferring system-level trust properties may be designed to calculate the probability of completion of the given mission plan within the given bounds, but for the example shown in FIG. 5, it calculates ranges for each of these parameters.

As illustrated in the embodiment shown in FIG. 5, the functional components are arranged in a control hierarchy that includes a high level planning function 583-1, a navigation function 583-2, a drive operation. function 583-3, a light sensor control function 583-4, an arm control function 583-5, a power management function 583-6, and a communication function 583-7 located at a lower end of the control hierarchy.

The system-level trust properties modeled for the example illustrated in FIGS. 4 and 5 were those of safety 581-1, liveness 581-2, criticality 581-3, real-time issues 581-4, and performance 581-5 although more, less, or other system-level properties may be used in some embodiments. Each of the modeled system-level trust properties includes a number of system requirements, which are mapped to one or more appropriate functional components. As noted above, FIG. 5 shows a portion of this mapping. As illustrated in FIG. 5, the components affected are within different levels of the hierarchy, demonstrating that trust properties may not necessarily result in system requirements at only one level of abstraction within the robot control hierarchy.

In the example illustrated in FIGS. 4 and 5, the combination of robot platform, scenario, and system model can be sufficient to model details at multiple levels of the hierarchy, enabling the use of abstraction and composition to analyze system behavior. The propagation of error through the model can be an important aspect of this analysis. The physical components at the device level have a built in error based on the manufacturing and maintenance of that part. At the control level, sensor accuracy, internal error correction, and mechanical differences can be modeled. At the planning and execution level the algorithms themselves, the modes incorporated, and both active and passive mitigation plans affect the error values. And, finally, how the environment that the robot is performing in affects the results through the physical properties such as traction 585-4 was modeled.

Tests on each motor (e.g., 585-2, 585-3, and 586) were run to determine its behavioral error under different circumstances. In one test, it was discovered that one of the motors performed at a significantly different speed from the others which affected the results when measured over time rather than by number of revolutions. Based upon these results, it was determined to discard that motor for future time-based tests. This was particularly important later as two motors were used in parallel to control the direction of the robot. The data collected from these experiments allowed the performance and error values for the devices in this example constraint model to be set.

The light sensor software worked in two modes, scan and track. These modes were implemented to work at different frequencies. The scan mode worked on the 40 Hz bandwidth, completing a 360 degree turn and then moving to the brightest light source recorded on the scan. Once a source had been located the 20 Hz process took over by continuously tracking the light. This was done by comparing the current light value to the light values one degree b each side of it, the brightest of those became the new current value. If the tracking value changed by too large of an amount then a complete rescan was performed.

In addition to the scan and track operations used for the light sensor 585-6 it appeared necessary to add an additional limitation based on the mechanical restraints of the robot kit. A cable connecting the light sensor 585-6 to the main robot brick would get wound up around the sensor each time the sensor turned 360 degrees. The cable was long enough to do this two or three times, but would then interfere with the turning rate. To nullify this issue a limit was placed on the number of degrees the sensor would track in one direction and having it turn back 360 degrees the opposite way to unwind the cord. It was found, based on the experiments, that using 400 degrees for the sensor tracking limit was sufficient for these tests.

Also at the device level the mechanical error on the arm movement was identified. This constant was added to the constraint model (e.g. a formal constraint model such as 230 of FIG. 2).

The next set of experiments for the example embodiment shown in FIGS. 4 and 5 looked at the control layer components of the robot 475 and their behavior. These tests focused on how the different power levels and built in error correction methods affect performance and more importantly affect the error values. By using the motor values, the error of the robot could be predicted (e.g., by calculating how the errors from the two motors would combine due to timing offset—for simplicity, a constant was used). By comparing these theoretical results to the actual robot results, the error correction done by the motor controller could be determined. A comparison of these results with both the controller using the built-in. error correction and without can be made. In the example embodiment, the error correction actually gives worse results unless the power is on full or nearly full (greater than 68%).

Based upon these results, it was determined that using a reset for low power operations may not provide the optimal result, while using it for high power movements could be beneficial. Hidden trade-offs like these that occur at an intermediate level of abstraction can be important because it shows that changing control methods or behaviors can in some instances result in significant and non obvious changes in the end results.

The control level testing for the example embodiment illustrated in FIGS. 4 and 5 focused on the turning behaviors of the robot 475. There are two control methods for performing turns. The first is to turn the one wheel while keeping the other stationary and the second is to turn one wheel forward while the other turns backwards. The offset which occurs for the one wheel powered approach was ignored in this example. The tests showed that turning the robot could produce large errors. The predicted errors were based on performing a quarter rotation at varying power levels both with and without the reset. Without taking traction into account it was calculated that the robot 475 would turn 51.4 degrees with an expected turn error for the end angle of the robot between 0.6 degrees and 1.0 degrees. The actual errors were between 5 and 12 degrees, with the largest errors coming for low powered turns. This analysis led to a belief that this was from the light weight of the robot 475 and lack of traction at low power. To adjust the model of the robot system 475 to fit the recorded behavior, a turn error factor of 8.0 was added.

Finally with the device and control layers of the robot 475 modeled, the planning and execution layers were added and predictions about the robot's behavior were made. For example, experimentation with changing the robot's course navigation code to analyze different operating modes and algorithms was performed. Three navigation algorithms were used for these example experiments. The first, "direct routing" code, simply weaved through the obstructions 476-1, 476-2, and 476-3 to reach the end region 478-1, The formal constraint model was used. to calculate the error on each leg or turn of the route, which compounded for each additional leg and turn.

To minimize the compound errors associated with the direct routing code, two additional algorithms, conformant positioning and limited turn routing, were implemented and added to the formal constraint model. Conformant positioning used a wall 477 (or known obstacle like a docking platform) to minimize the error in one dimension. Once the robot 475 found the wall it could reset the error in that dimension. In limited turn routing, the number of turns was minimized which reduced the number of legs and turns, but also increased the leg length and angles.

The formal constraint model was used to compare these three planning solutions against changing requirements. For example, if a component requirement was added to restrict the turn radius (e.g., due to either mechanical design or a performance issue), the limited turn routing algorithm was not feasible and resulted in an increased error. If accurate navigation was required (e.g., low error), a conformant positioning algorithm was used coupled with sensors to detect when it reached the end region 478-1 and docked successfully at the target 479.

In some embodiments, the time/power usage for each of these navigation algorithms can be compared. In an example embodiment where this was utilized, the conformant course navigation was the worst in this category, and again the limited turn did well. However, if the test was concerned about the obstacles 476-1, 476-2, and 476-3, the limited turn approach gave the slimmest room for error, and in a number of test runs the obstacles were often hit, either damaging the robot 475 or an obstacle.

In the example illustrated in FIGS. 4 and 5, alternate solutions which modified some part of the robot, its environment, or its programming were collected. For example, the planning algorithms were modified by tightening the course navigation restrictions and shortening the time period required. Experimentation was also performed by adding execution restrictions such as limiting the turning radius allowed for stability of the robot, or adding power constraints. Control level errors were introduced by not resetting internal compensation for drift and by modifying the power levels on the individual motors, and finally device level issues were introduced by substituting sensors or motors with poorer performance than those originally used.

Each of these experimental changes helped. verify the ability of embodiments of the innovation to predict the robot's behavior, recognize impact of the changes, and provide confidence (e.g., trust) that the system-level properties could be modeled to the level needed. For example, after reconfiguring the robot 475 so as to alter its weight by adding an additional arm, the innovation (e.g., a tool implementing an analysis flow such as that described in FIG. 2) accurately determined that some system-level properties are no longer guaranteed and identified sufficient changes to the current control system to re-establish those system-level properties.

Figure 6:
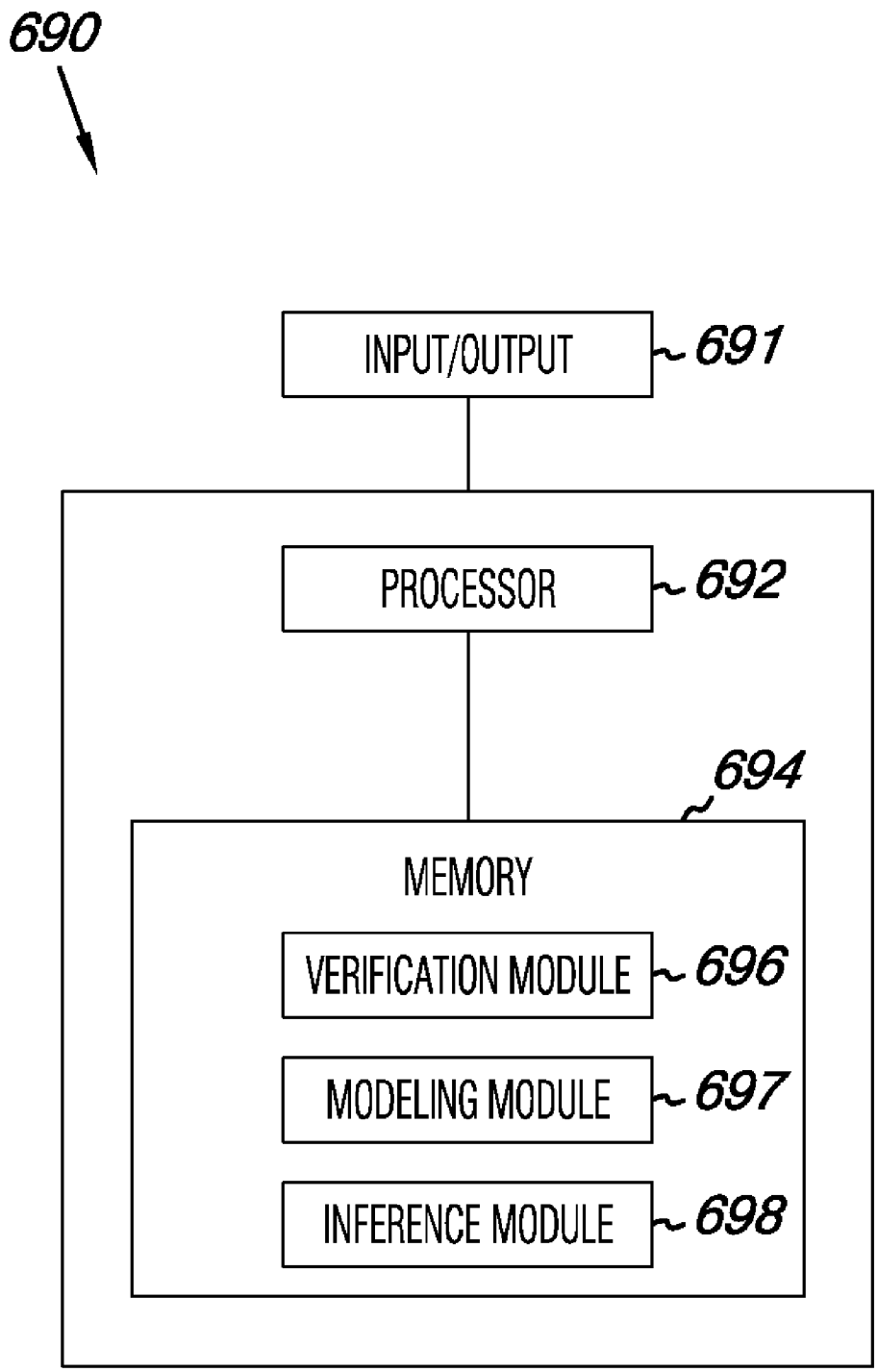
FIG. 6 illustrates a tool for inferring system-level properties in accordance with one or more embodiments of the present disclosure.

FIG. 6 illustrates a tool 690 for inferring system-level properties in accordance with one or more embodiments of the present disclosure. In the embodiment illustrated in FIG. 6, the tool 690 is a computing device having a processor 692, a memory 694, and an input/output component 691.

The input/output component 691 can receive data from a particular system for which one or more system-level properties are to be verified. The received data can be data received from one or more sensors of the particular system, for instance. In various embodiments, the received data (e.g. sensor data) can be used by one or more of the modules 696, 697, and 698 to infer system-level. properties as described herein.

In the embodiment illustrated in FIG. 6, the memory 694 includes a number of modules (e.g., Verification Module 696, Modeling Module 697, and Inference Module 698). The modules 696, 697, and 698 can be executable instructions (e.g., program instructions) such as software modules or applications executable by processor 692 to perform embodiments of the present disclosure as described herein.

For instance, in one or more embodiments, the verification module 696 can be configured. to verify a number of component. properties corresponding to a number of components of a particular system (e.g., a particular system such as those described herein for which system-level trust properties are to be inferred). Also, in various embodiments, the modeling module 697 can be configured to generate a constraint model (e.g., constraint model 230) based on a system model (e.g., system model 200) and a number of verified component properties (e.g., a number of components verified via V&V techniques 210). In various embodiments, the inference module 698 can be configured to analyze the constraint model (e.g., via a constraint solver such as 240 shown in FIG. 2) to determine whether one or more particular system-level properties can be inferred from the constraint model (e.g., 230).

In various embodiments, the inference module 698 is configured to reason across different levels of abstraction to determine whether the one or more particular system-level properties can be interred from the constraint model. The inference module 698 can include forms of reasoning that includes composition, embedding, and abstraction, as described above.

In one or more embodiments, the inference module 698 is configured to derive a number of system-level properties based on a number of performed component level tests and determine a number of additional component level tests sufficient to provide verification of a particular set of system-level properties (e.g., system-level properties 202 shown in FIG. 2).

In various embodiments, the inference module 698 is configured to determine, for each of the one or more particular system-level properties, whether the particular system-level property can be inferred from the constraint model and whether additional information is needed to determine whether the particular system-level property can be inferred from the constraint model. In one or more embodiments, the inference module 698 is configured to propose one or more additional constraints sufficient for a constraint solver (e.g., 240) to determine whether the one or more particular system-level properties can be inferred from the constraint model (e.g., 230) when it is determined that additional information is needed to determine whether the particular system-level property can be inferred from the constraint model.

In various embodiments of the present disclosure, the tool 690 can include a planning module configured to generate a number of trusted plans to a particular system goal. In various embodiments, the tool 691 can include a reconfiguration module configured to reconfigure the system in response to at least one of: a change in at least one environment; a change in the system; a change in one or more of the mission requirements; and a change in one or more of the system-level properties.

Various embodiments of the present disclosure can be performed by software and/or firmware (i.e., computer executable instructions), hardware, application modules, and the like, executable and/or resident on the tools, systems, and devices shown herein or otherwise.

CONCLUSION

The present disclosure includes methods, devices, and systems for inferring system-level properties. One or more embodiments include generating a constraint model based on a system model having a number of components at different levels of abstraction and on a number of verified component properties. The constraint model can include a number of mission constraints modeling one or more mission requirements, a number of system constraints modeling one or more system-level properties, and a number of component constraints modeling one or more component properties. One or more embodiments can include analyzing the constraint model with a constraint solver to determine whether one or more particular system-level properties can he inferred from the constraint model.

One or more embodiments of the innovation provide a representation and reasoning system for system-level T&E and V&V of high-level autonomous control for complex systems operating in rich and unpredictable environments. Such embodiments can facilitate implementing and fielding trusted high-level autonomous control systems across a range of relevant applications, including manned and unmanned aircraft, spacecraft, rovers, and habitats. In some instances, implementing such capabilities will simplify control system reconfiguration in response to changes in the environment, the system being controlled, and/or the mission profile.

Embodiments of the present disclosure can, for example, provide: expressive models of behavioral characteristics and/or constraints so that system requirements can be captured with greater fidelity; inference over those models that is sufficient to provide proofs of (in)validity; one or more methods for deriving additional behavioral constraints on system components that can serve as assumptions, the confirmation of which by testing would suffice to enable a proof of validity; one or more models of the complex system as a whole, including, for example, multiple layers of software at all different levels of abstraction, and all ultimately interacting with a set of hardware sensors and effectors (in such embodiments mission specifications and/or the characteristics of the operating environment should be included); and one or more methods to support reasoning about a mixture of discrete and continuous values.

Embodiments of the innovation include a representation and reasoning system that uses hybrid constraint-based behavioral envelopes to support reasoning about the interaction of component properties, such as how the composition of those properties can be used to verify properties of the system as a whole. In such embodiments, if the desired system properties cannot be proved from the current set of component properties, the reasoning approach can be used as a tool to explore additional assumptions on component properties under which the desired system properties could be shown to hold.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one.

Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim. standing on its own as a separate embodiment.

What is claimed is:

1. A method for inferring system-level properties, comprising:
   maintaining a system model having a number of levels of abstraction, the system model including:
      a number of physical system components within a component hierarchy; and
      a number of control functions at different levels of abstraction within a control hierarchy;
   providing a number of mission requirements;
   providing a number of system-level properties;
   mapping at least one of the number of system-level properties to one or more of the number of control functions;
   mapping at least one of the system-level properties to one or more of the number of physical system components;
   generating a constraint model from the system model, the number of mission requirements, and the number of system-level properties; and
   reasoning across the constraint model to determine whether one or more of the number of system-level properties mapped to the one or more of the number of control functions and to the one or more of the number of physical system components are satisfied in response to one or more particular adjustments to:
      the number of mission requirements;
      the number of system-level properties;
      the system model;
      the number of physical system components; and
      the number of control functions.

2. The method of claim 1, wherein the number of levels of abstraction include:
   a device layer;
   a control layer;
   an execution layer; and
   a planning layer.

3. The method of claim 1, wherein the system model includes a model of at least one environment in which the system is to perform.

4. The method of claim 3, including reconfiguring the system in response to at least one of:
   a change in the at least one environment;
   a change in the system; and
   a change in one or more of the number of mission requirements.

5. The method of claim 1, including reconfiguring the system in response to a determination that the one or more of the system-level trust properties is unsatisfied in response to the one or more particular adjustments to:
   the number of mission requirements;
   the number of system-level properties;
   the system model; and
   the one or more of the control functions.

6. The method of claim 1, wherein the constraint model includes:
- a number of mission constraints modeling one or more of the number of mission requirements;
- a number of system constraints modeling one or more of the number of system-level properties; and
- a number of component constraints modeling one or more of the number of control functions.

7. The method of claim 1, including developing at least one inverse inference based, at least partially, on the generated constraint model.

8. The method of claim 1, including deriving a set of component-level properties sufficient to determine whether a particular one of the number of system-level properties remains satisfied.

9. A tool for inferring system-level properties, comprising:
- a processor;
- memory coupled to the processor;
- a verification module stored in the memory and executable by the processor to verify a number of component properties corresponding to a number of components of a particular system;
- a modeling module stored in the memory and executable by the processor to generate a constraint model based on a system model and a number of verified component properties, wherein the system model includes:
  - a component architecture and hierarchy;
  - a control architecture and hierarchy;
  - a number of mission requirements; and
  - a number of system-level properties; and
- wherein the constraint model includes:
  - a number of mission constraints modeling one or more of the number of mission requirements;
  - a number of system constraints modeling one or more of the number of system-level properties; and
  - a number of component constraints modeling one or more of a number of component properties associated with the component architecture and hierarchy and the control architecture and hierarchy; and
- an inference module stored in the memory and executable by the processor to analyze the constraint model to determine whether one or more particular system-level properties can be inferred from the constraint model.

10. The tool of claim 9, wherein the inference module is configured to reason across different levels of abstraction to determine whether the one or more particular system-level properties can be inferred from the constraint model.

11. The tool of claim 10, wherein the inference module includes forms of reasoning that includes composition, embedding, and abstraction.

12. The tool of claim 9, wherein the inference module is configured to:
- derive a number of system-level properties based on a number of performed component level tests; and
- determine a number of additional component level tests sufficient to provide verification of a particular set of system-level properties.

13. The tool of claim 9, wherein the system is an unmanned autonomous system.

14. The tool of claim 9, wherein the system is an unmanned vehicle.

15. The tool of claim 9, wherein the inference module is a hybrid constraint solver including discrete and continuous values.

16. The tool of claim 9, wherein the system includes a planning module configured to generate a number of trusted plans to a particular system goal.

17. The tool of claim 9, including a reconfiguration module configured to reconfigure the system in response to at least one of:
- a change in at least one environment;
- a change in the system;
- a change in one or more of the mission requirements; and
- a change in one or more of the system-level properties.

18. The tool of claim 9, wherein the inference module is configured to determine, for each of the one or more particular system-level properties:
- whether the particular system-level property can be inferred from the constraint model; and
- whether additional information is needed to determine whether the particular system-level property can be inferred from the constraint model.

19. The tool of claim 18, wherein the inference module is configured to propose one or more additional constraints sufficient for a constraint solver to determine whether the one or more particular system-level properties can be inferred from the constraint model when it is determined that additional information is needed to determine whether the particular system-level property can be inferred from the constraint model.

* * * * *